(12) United States Patent
Miyake et al.

(10) Patent No.: US 9,377,070 B2
(45) Date of Patent: Jun. 28, 2016

(54) VEHICLE DISC BRAKE

(71) Applicant: NISSIN KOGYO CO., LTD., Ueda, Nagano (JP)

(72) Inventors: Yasunori Miyake, Nagano (JP); Shinobu Kaneko, Nagano (JP); Shinichi Kihara, Nagano (JP)

(73) Assignee: NISSIN KOGYO CO., LTD., Nagano (JP)

( * ) Notice: Subject to any disclaimer, the term of this patent is extended or adjusted under 35 U.S.C. 154(b) by 0 days.

(21) Appl. No.: 14/304,281

(22) Filed: Jun. 13, 2014

(65) Prior Publication Data

US 2014/0367208 A1    Dec. 18, 2014

(30) Foreign Application Priority Data

Jun. 18, 2013 (JP) ................................. 2013-127335

(51) Int. Cl.
*F16D 55/22* (2006.01)
*F16D 65/097* (2006.01)
*F16D 55/227* (2006.01)

(52) U.S. Cl.
CPC .......... *F16D 65/0978* (2013.01); *F16D 55/227* (2013.01)

(58) Field of Classification Search
CPC .............. F16D 65/097; F16D 65/0972; F16D 65/0977; F16D 65/0978; F16D 65/0979
USPC .................... 188/72.3, 73.37, 73.38
See application file for complete search history.

(56) References Cited

U.S. PATENT DOCUMENTS

| 4,364,455 A * | 12/1982 | Oshima ................... 188/1.11 W |
| 4,498,559 A * | 2/1985 | Katagiri et al. .......... 188/1.11 W |
| 5,934,417 A * | 8/1999 | Kobayashi et al. .......... 188/72.3 |
| 2011/0042913 A1* | 2/2011 | Landau ......................... 267/285 |

FOREIGN PATENT DOCUMENTS

| EP | 560146 A2 * | 9/1993 |
| GB | 2166822 | 5/1986 |
| JP | S61109928 | 5/1986 |
| JP | 2000161395 | 6/2000 |
| JP | 2000220670 A | 8/2000 |

(Continued)

OTHER PUBLICATIONS

Pro-Quest translation JP 2000220670 A, Aug. 2000.*

(Continued)

*Primary Examiner* — Thomas J Williams
(74) *Attorney, Agent, or Firm* — Andrew M. Calderon; Robert Mlotkowski Safran & Cole, P.C.

(57) ABSTRACT

Each pad return spring includes a lug piece attachment portion that is attached to a corresponding lug piece, and a pad return portion. The lug piece attachment portion of each pad return spring includes a first piece that is disposed on a first surface, on a disc rotor side, of the corresponding lug piece, a second piece that is disposed on a second surface, on the opposite side to the disc rotor side, of the corresponding lug piece, and a connection piece that connects the first piece and the second piece. The lug piece attachment portion of each pad return spring has a substantially U shape in section. The lug piece attachment portions are formed with engagement claw portions, and the lug pieces are formed with engagement grooves.

12 Claims, 9 Drawing Sheets

(56) References Cited

FOREIGN PATENT DOCUMENTS

| JP | 2002327780 A | * | 11/2002 |
| JP | 2004176869 A | * | 6/2004 |
| JP | 2006153139 | | 6/2006 |
| JP | 2007315577 | | 12/2007 |
| JP | 2008241046 A | * | 10/2008 |
| JP | 2012063014 A | * | 3/2012 |

OTHER PUBLICATIONS

Pro-Quest translation JP 2007315577 A, Dec. 2007.*
Pro-Quest translation JP 2000161395 A, Jun. 2000.*
Japanese Office Action for related JP Application No. 2013-127335, dated Apr. 21, 2015, 7 pages.

* cited by examiner

VEHICLE DISC BRAKE

CROSS REFERENCE TO RELATED APPLICATION

This application is based on and claims priority under 35 U.S.C. §119 to Japanese Patent Application No. 2013-127335 (filed on Jun. 18, 2013), the entire contents of which are incorporated herein by reference.

BACKGROUND

1. Field

The invention relates to a vehicle disc brake for use in a vehicle such as a motor vehicle or a motorcycle, and more particularly to a vehicle disc brake including pad return springs which forcibly separate friction pads from a disc rotor when the brakes are released.

2. Related Art

For example, JP 2000-220670 A describes a vehicle disc brake.

SUMMARY

One exemplary embodiment of the invention provides a vehicle disc brake that can facilitate attaching a pad return spring to a side portion of a back plate of a friction pad and can reduce a manufacturing cost.

(1) A vehicle disc brake includes a caliper bracket, a pair of friction pads, and pad return springs. The caliper bracket is to be fixed to a vehicle body. The caliper bracket includes a pair of caliper support arms that straddle an outer edge of a disc rotor in a disc axis direction. The pair of friction pads are disposed across the disc rotor. Each friction pad includes a back plate having side portions. Each pad return spring is disposed between the corresponding caliper support arm and the corresponding side portion of the back plate. Each pad return spring urges the corresponding friction pad toward an opposite side to the disc rotor when braking is released. Each pad return spring includes a back plate attachment portion and a pad return portion. The back plate attachment portion of each pad return spring is attached to the corresponding side portion of the back plate. The pad return portion of each pad return spring extends from the back plate attachment portion toward the opposite side to the disc rotor and then bends toward a disc rotor side. The pad return portion of each pad return spring has a distal end abutting against a corresponding side surface, opposite to the disc rotor, of the caliper support arm. The back plate attachment portion of each pad return spring includes a first piece, a second piece, and a connection piece. The first piece is disposed on a first surface, on the disc rotor side, of the corresponding side portion of the back plate. The second piece is disposed on a second surface, on the opposite side to the disc rotor side, of the corresponding side portion of the back plate. The connection piece is disposed on an outer end surface of the corresponding side portion of the back plate and connects the first piece and the second piece. The back plate attachment portion of each pad return spring has a substantially U shape in section. A part of one of the back plate attachment portion of each pad return spring and the corresponding side portion of the back plate engages with the other.

(2) Each pad return spring may be formed by bending a strip-shape plate member.

With this configuration, the pad return springs can easily be attached to the side portions of the back plate by fitting the back plate attachment portions of the pad return springs to the side portions of the back plate. As a result, work required to assemble the pad return springs can be reduced, to thereby make it possible to reduce the manufacturing costs.

(3) The one of the back plate attachment portion of each pad return spring and the corresponding side portion of the back plate may include an engagement protrusion portion. The other of the back plate attachment portion of each pad return spring and the corresponding side portion of the back plate may be formed with an engagement groove with which the engagement protrusion portion engages.

With this configuration, the side portions of the back plate and the back plate attachment portions can be brought into engagement with each other with the simple structure.

(4) The first and second pieces of the back plate attachment portion of each pad return spring may be formed with the engagement protrusion portions that bend toward the corresponding side portion of the back plate so as to gradually approach each other as it goes toward the connection piece. The first and second surfaces of each side portion of the back plate are formed with the engagement grooves.

With this configuration, the back plate attachment portions of the pad return springs are fitted to the side portions of the back plate while forcing the engagement protrusion portions to open. When the engagement protrusion portions are disposed in the positions which correspond to the grooves, the engagement protrusion portions are restored to their initial states. This enables the engagement protrusion portions to be put in the grooves for engagement naturally. Because of this, the back plate attachment portions can easily be attached to the side portions of the back plate. Also, both the engagement protrusion portions and the grooves can be formed easily.

(5) Each pad return spring may further include a wearing detection portion at a distal end of the first piece thereof. Each wearing detection portion protrudes toward the disc rotor side. Each wearing detection portion is configured, when a wearing amount of a lining of the corresponding friction pad exceeds a predetermined wearing amount, to be in slide contact with the disc rotor so as to notify a wearing state of the lining.

With this configuration, the wearing detection portion is formed integrally with the pad return spring. This can reduce the number of parts involved, to thereby make it possible to reduce the manufacturing costs.

(6) Friction pad return forces of the pad return springs disposed on a disc entrance side from which the disc rotor enters when a vehicle travels forward may be stronger than those of the pad return springs disposed on a disc exit side to which the disc rotor exits when the vehicle travels forward.

With this configuration, the friction pad is spaced farther away from the side surface of the disc rotor at the disc entrance side than the disc exit side. Therefore, the friction pad can be restrained from being dragged by the disc rotor.

(7) Ones of the pad return springs disposed on the disc entrance side and (ii) the pad return springs disposed on the disc exit side may further include identifiers.

This configuration can prevent erroneous assembling.

DETAILED DESCRIPTION

Figure 1:
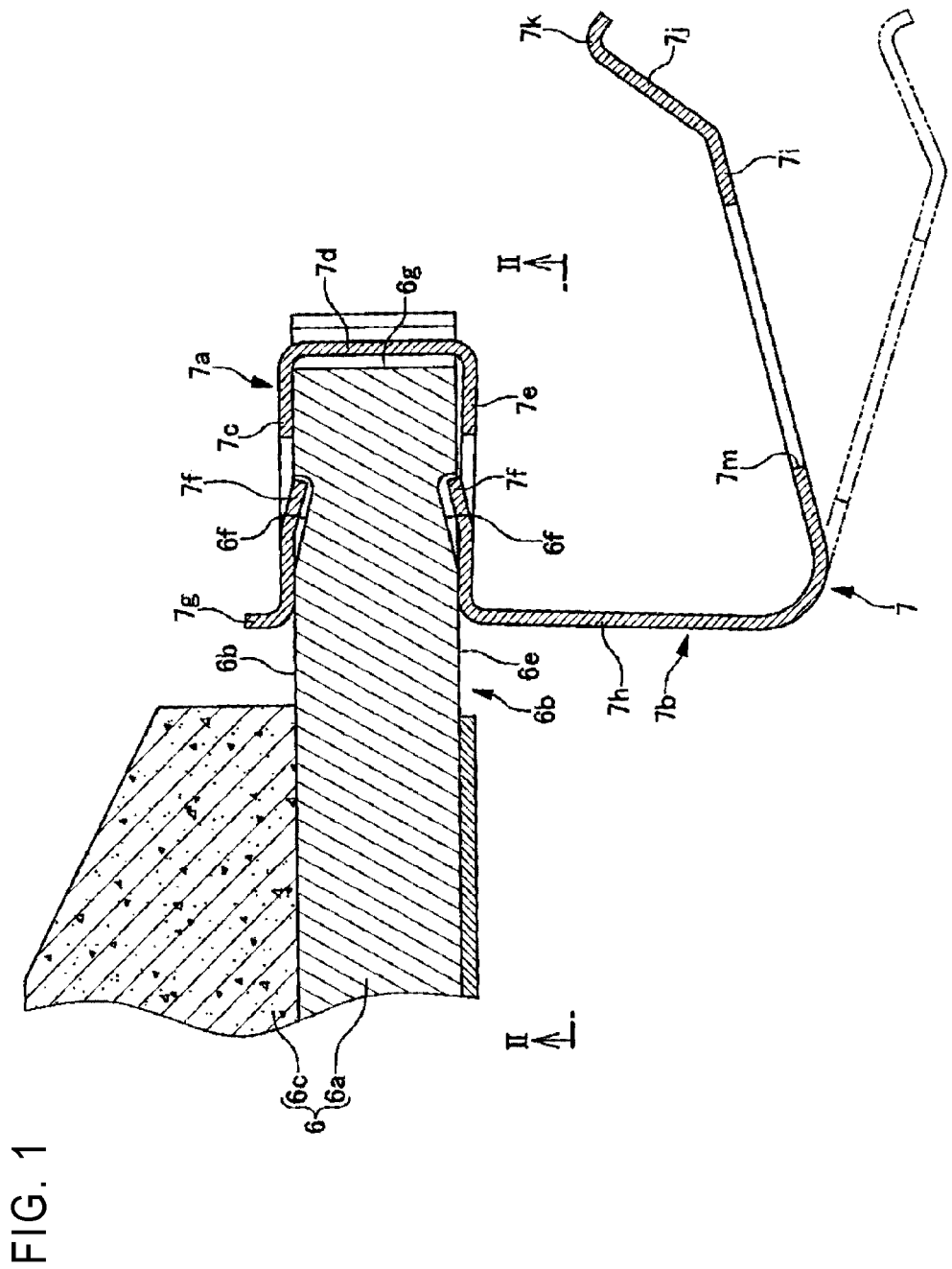
FIG. 1 is a section view taken along a line I-I in FIG. 2.
Figure 2:
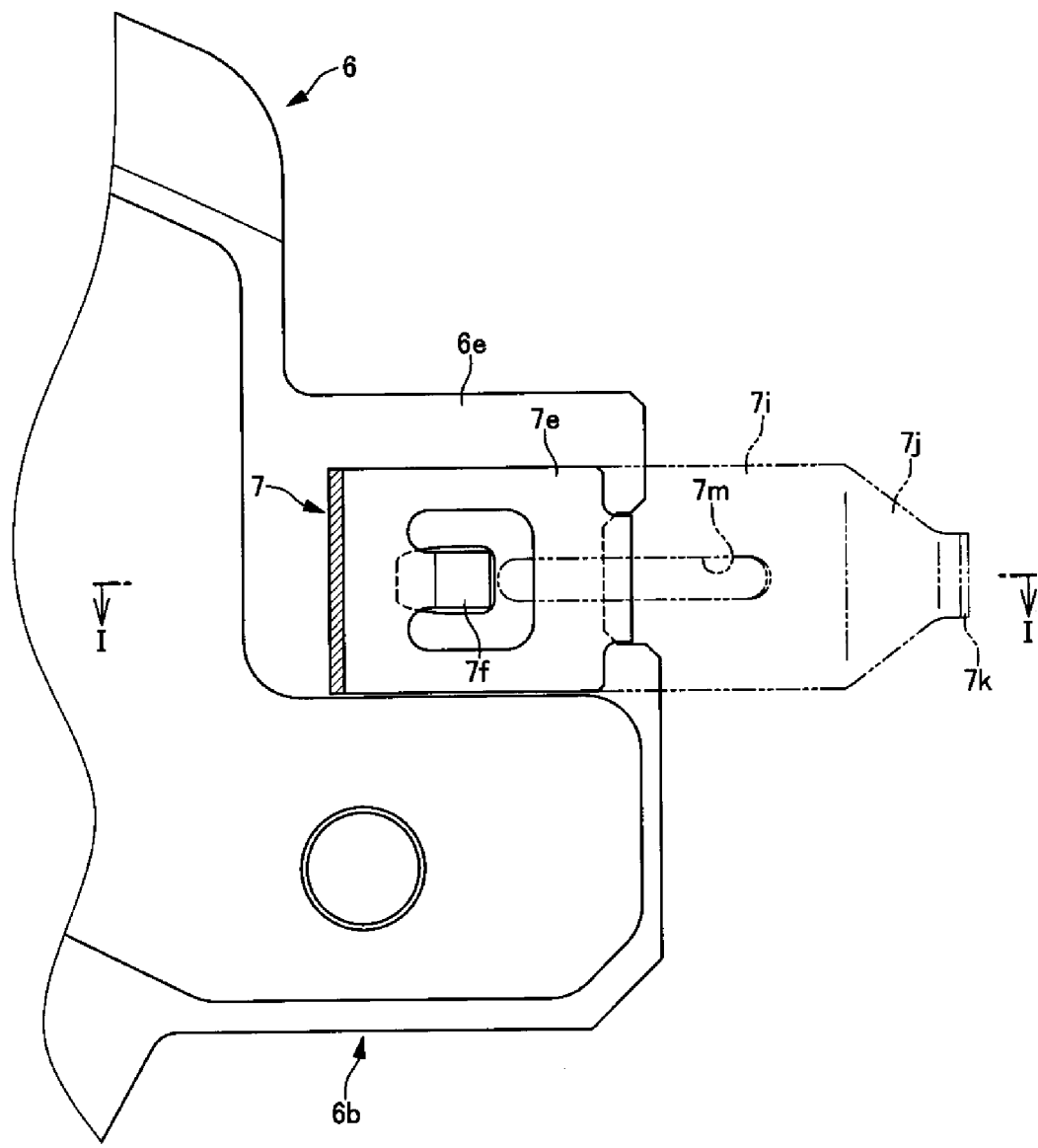
FIG. 2 is a section view taken along a line II-II in FIG. 1.
Figure 3:
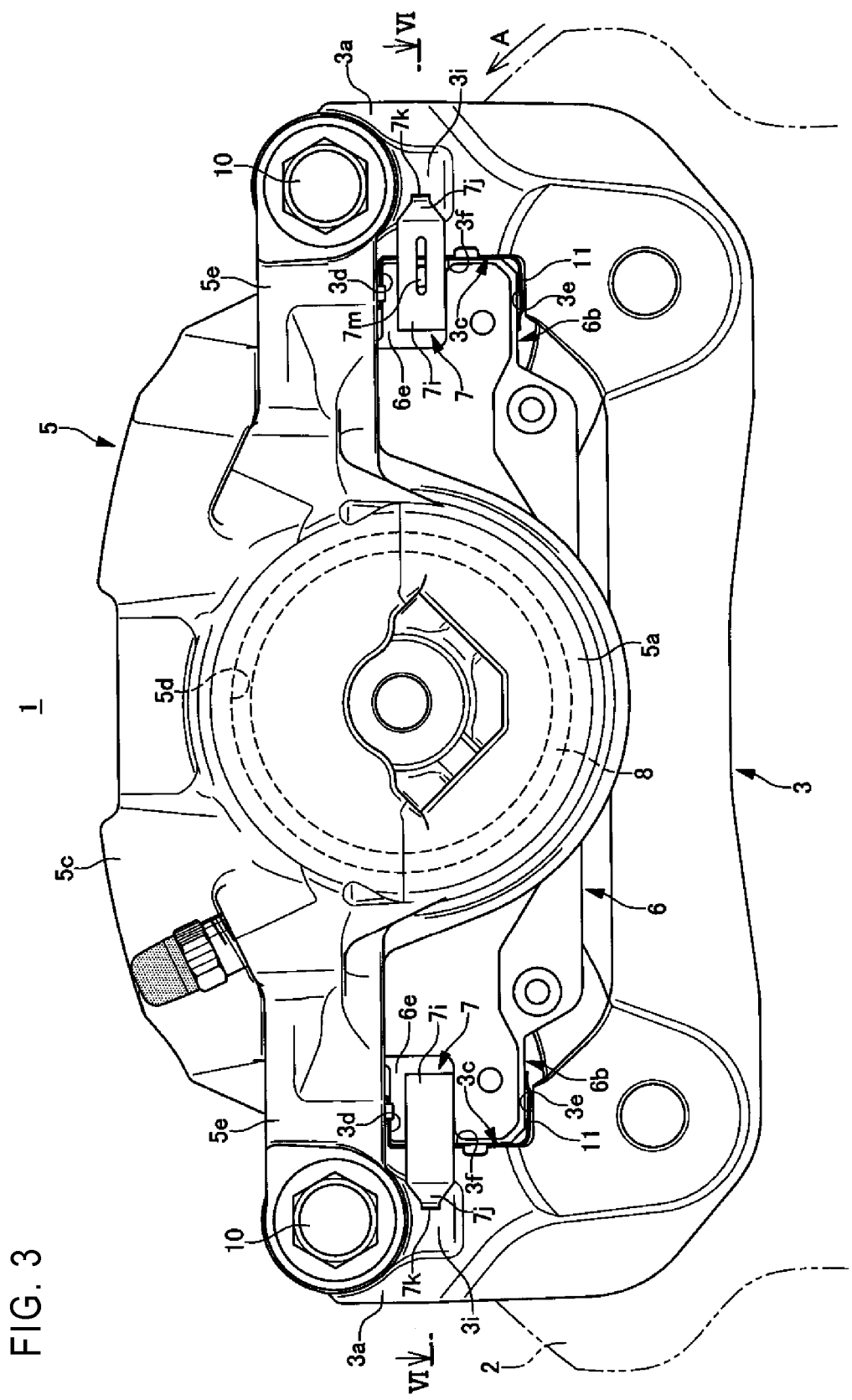
FIG. 3 is a front view of a vehicle disc brake according to one exemplary embodiment of the invention.
Figure 4:
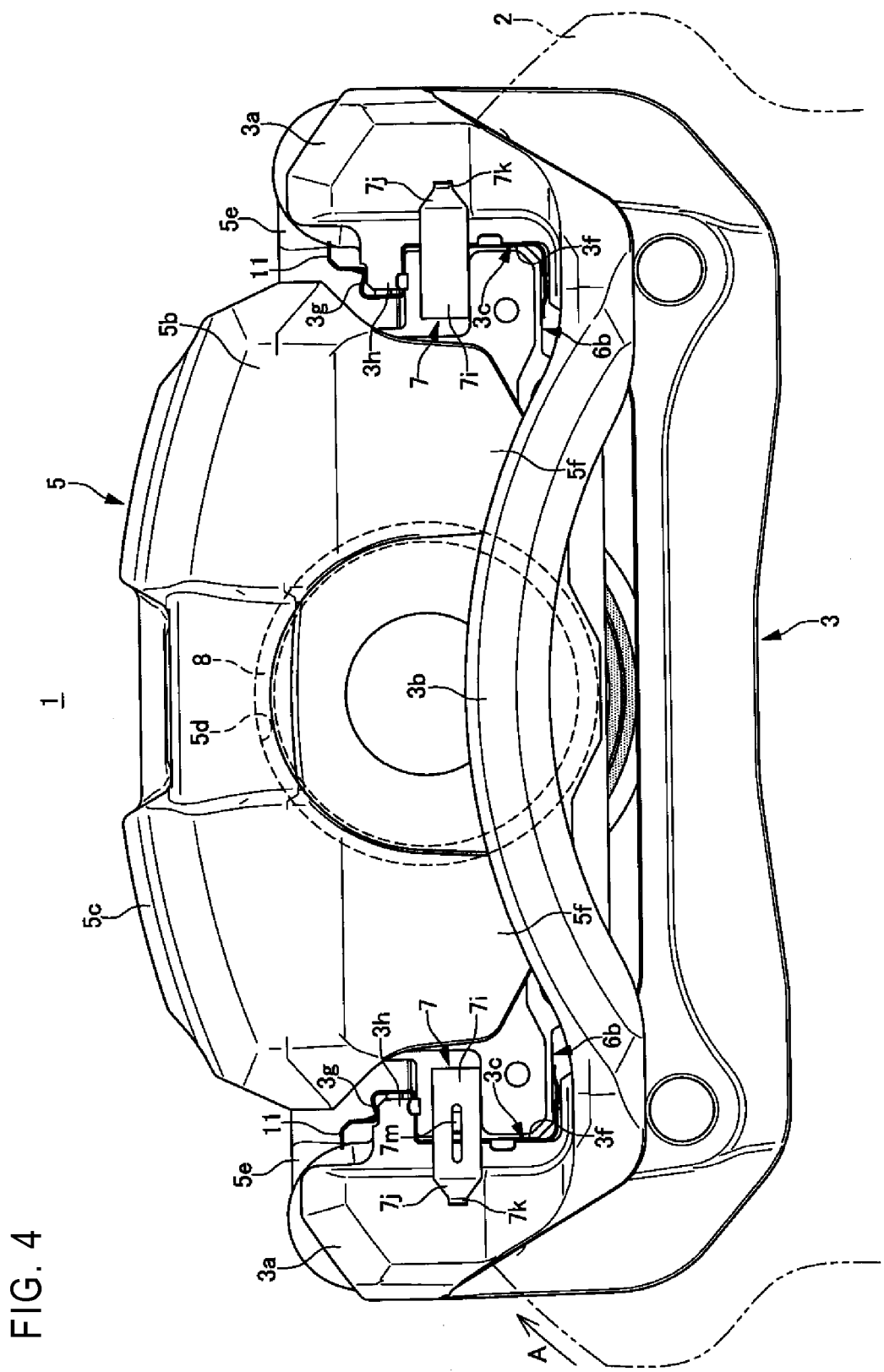
FIG. 4 is a rear view of the vehicle disc brake according to the one exemplary embodiment.
Figure 5:
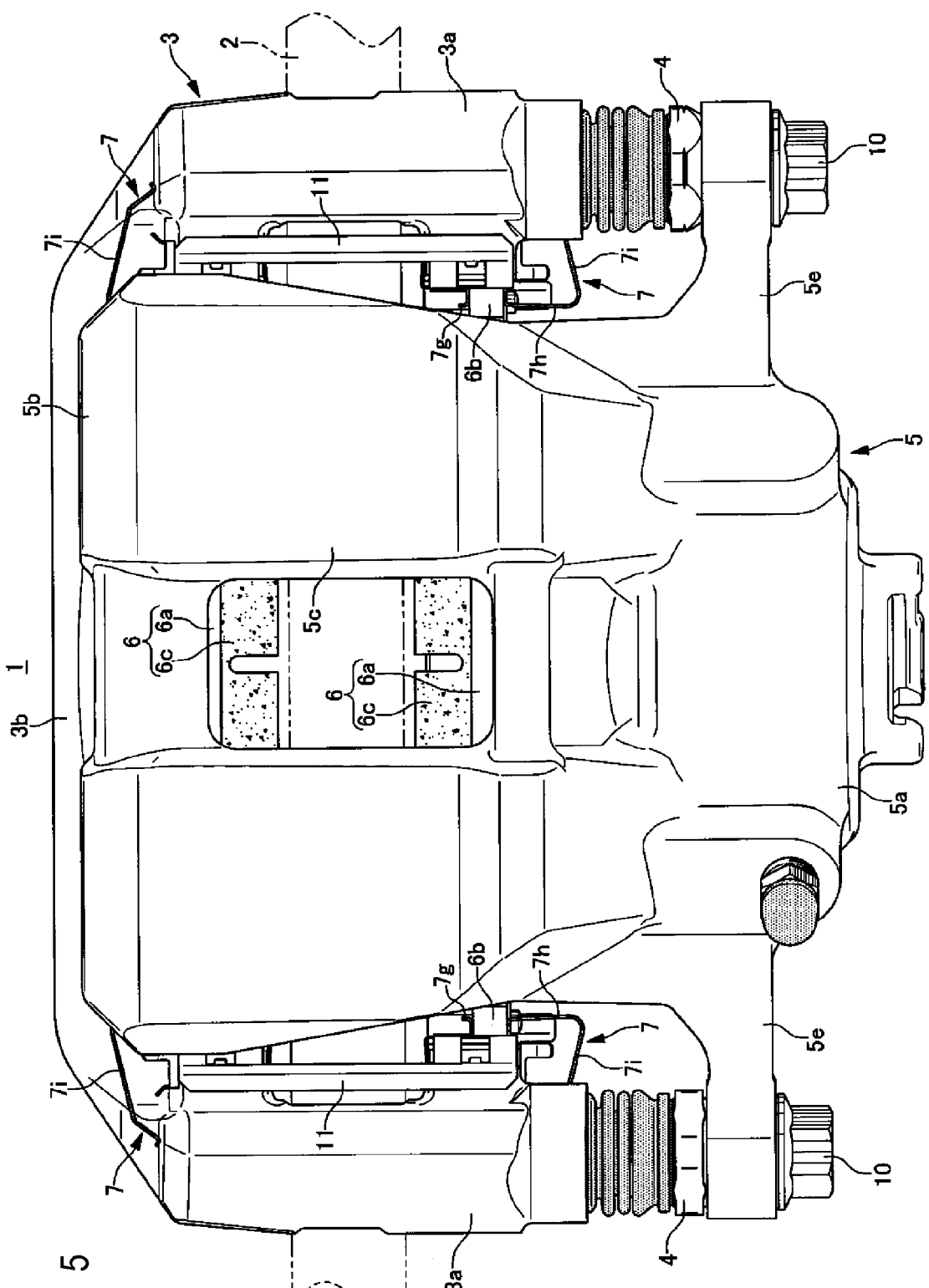
FIG. 5 is a plan view of the vehicle disc brake according to the one exemplary embodiment.
Figure 6:
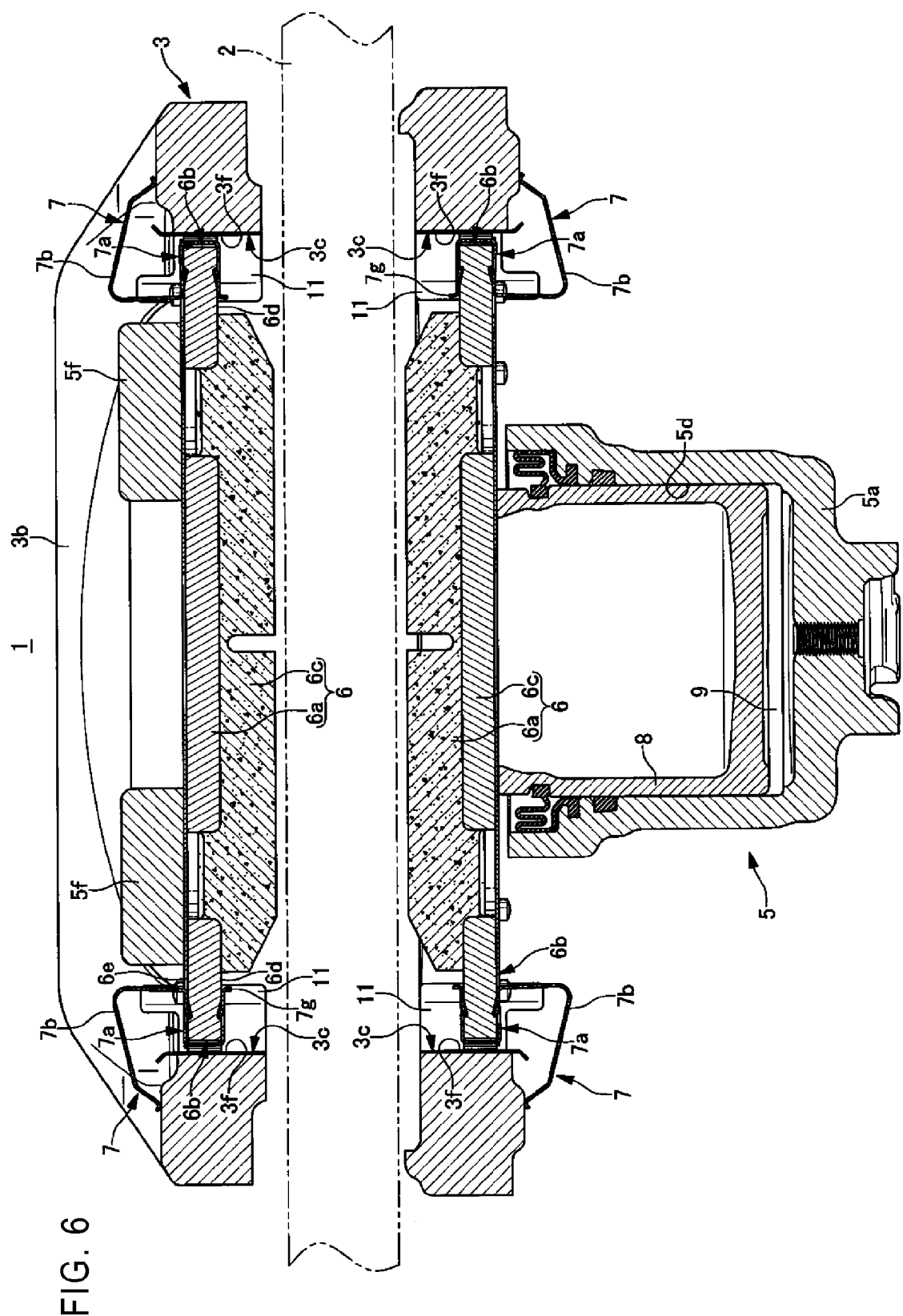
FIG. 6 is a section view taken along a line VI-VI in FIG. 3.
Figure 7:
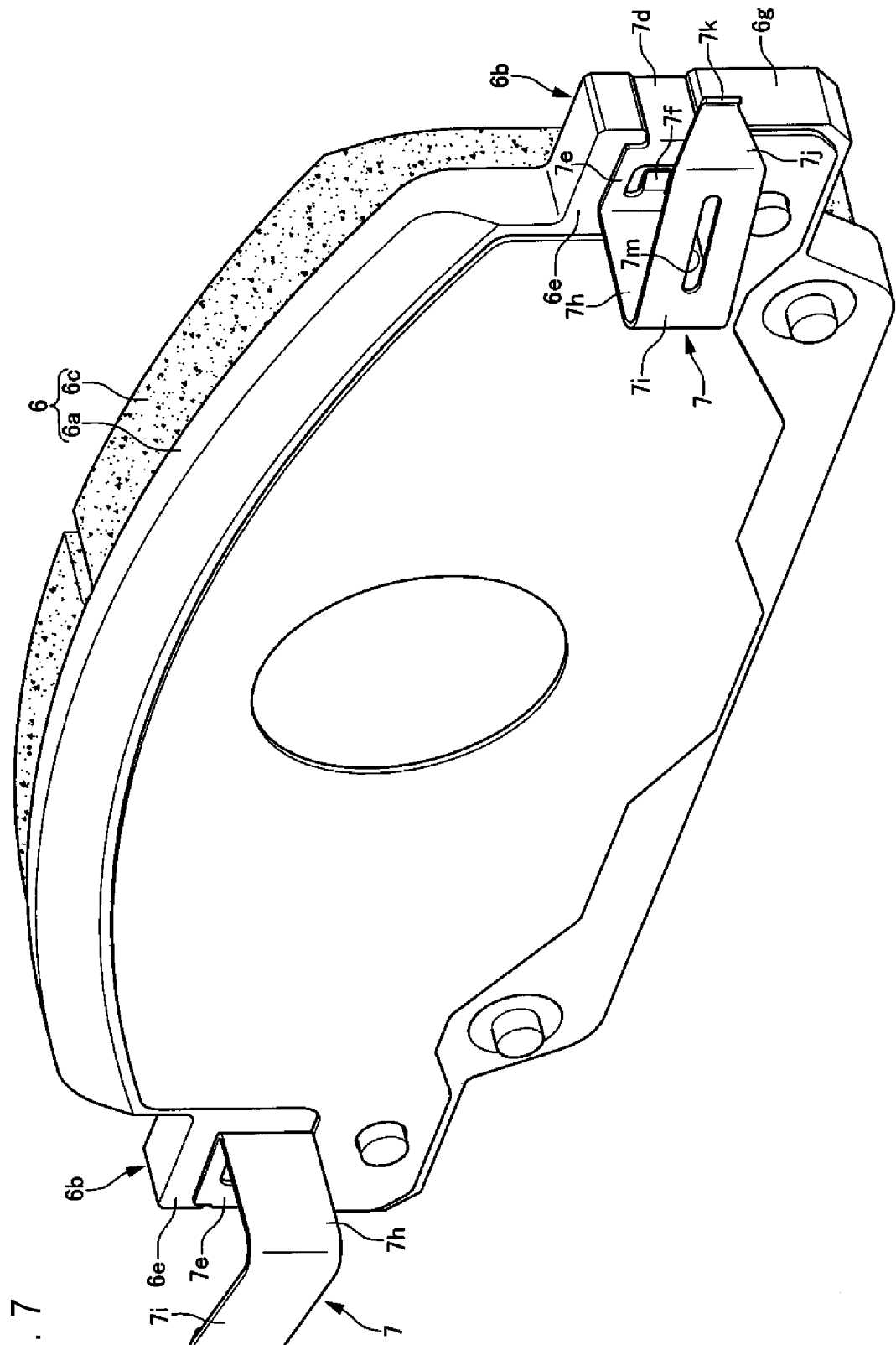
FIG. 7 is a perspective view showing a state in which pad return springs are assembled to a friction pad.
Figure 8:
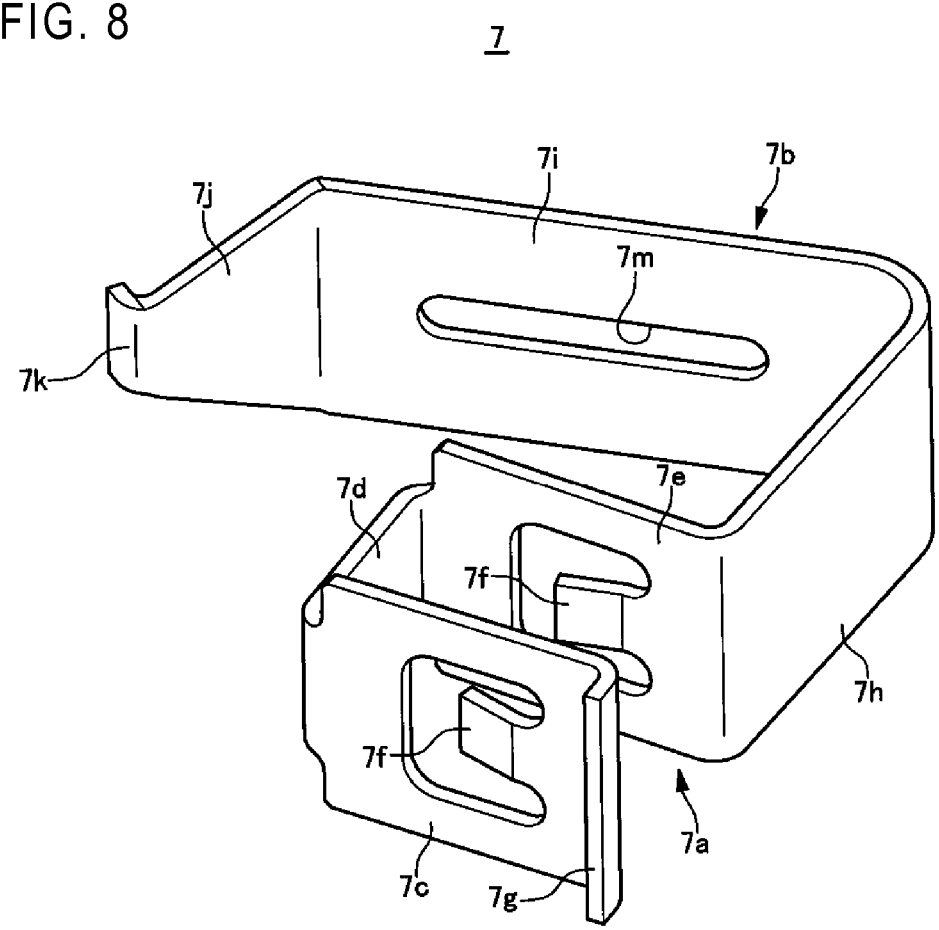
FIG. 8 is a perspective view of the pad return spring according to the one exemplary embodiment.
Figure 9:
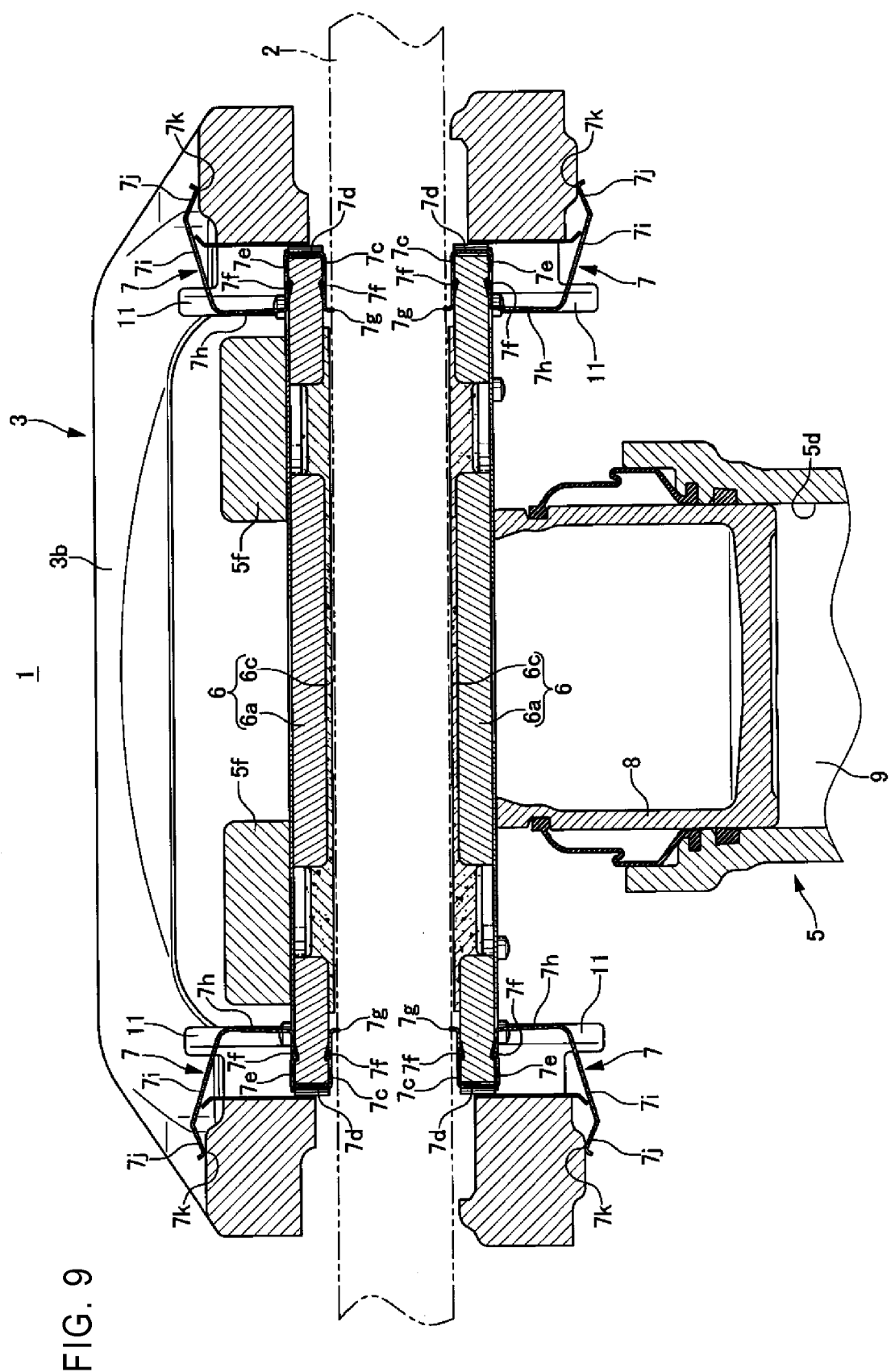
FIG. 9 is a sectional plan view of the vehicle disc brake with worn linings.

FIGS. 1 to 9 show a vehicle disc brake according to one exemplary embodiment of the invention. An arrow "A" denotes a rotational direction of a disc rotor which rotates together with a front wheel when a vehicle travels forwards. In the following description, a "disc exit side" and a "disc entrance side" mean a side where the rotating disc exits from a caliper when the vehicle travels forwards and a side where the rotating disc enters a caliper when the vehicle travels forwards.

This vehicle disc brake 1 includes a disc rotor 2, a caliper bracket 3, a caliper body 5, a pair of friction pads 6, 6, and four pad return springs 7. The disc rotor 2 rotates together with a wheel. The caliper bracket 3 is fixed to a vehicle body on one side of the disc rotor 2. The caliper body 5 is supported by a caliper support arms 3a, 3a of the caliper bracket 3 via a pair of slide pins 4, 4 so as to be movable in a disc axis direction. The pair of friction pads 6, 6 are disposed inside an acting portion 5a and a reacting portion 5b of the caliper body 5 so as to be opposite to each other across the rotor 2. The pad return springs 7 force the friction pads 6, 6 to retract from side surfaces of the disc rotor 2 when the brakes are released.

The caliper body 5 has the acting portion 5a, the reacting portion 5b and a bridge portion 5c. The acting portion 5a and the reacting portion 5b are disposed on the both sides of the disc rotor 2. The bridge portion 5c straddles an outer edge of the disc rotor 2 to connect the acting portion 5a and the reacting portion 5b together. A cylinder bore 5d is provided in the acting portion 5a so as to open towards the disc rotor 2 side. A bottomed cylindrical piston 8 is housed in the cylinder bore 5d. The piston 8 is configured to move in the disc rotor direction within the cylinder bore 5d by a hydraulic pressure supplied to a hydraulic pressure chamber 9 provided in a bottom portion of the cylinder bore 5d. Also, vehicle body attachment arms 5e, 5e protrude from both side portions, in a disc rotation direction, of the acting portion 5a. The above described slide pins 4 are provided at respective distal ends of the vehicle body attachment arms 5e via attachment bolts 10.

The caliper support arms 3a, 3a extend from both side portions, in the disc rotation direction, of the caliper bracket 3. The caliper support arms 3a, 3a straddle the outer edge of the disc rotor 2 in the disc axis direction with both sides of the bridge portion 5c being disposed therebetween. Further, the caliper support arms 3a, 3a extend in a disc center direction along a side wall of the reacting portion 5b on the other side of the disc rotor 2. Distal end portions of the caliper support arms 3a, 3a are connected to each other by a tie-rod 3b.

A guide hole (not shown) which houses the above described slide pin 4 is provided in each caliper support arm 3a. Also, four pad guide grooves 3c, 3c are provided in the caliper support arms 3a. The pad guide grooves 3c, 3c face each other on each side of the disc rotor 2. Each pad guide groove 3c includes a disc-radial-direction outer surface 3d, a disc-radial-direction inner surface 3e, and an opposing surface 3f. The opposing surface 3f connects the disc-radial-direction outer and inner surfaces 3d, 3e together. Each pad guide groove 3c has a substantially U shape. Each friction pad 6 has a back plate 6a and lug pieces 6b, 6b which protrude from both sides of the back plate 6a, respectively. The lug pieces 6b, 6b are supported movably in the pad guide grooves 3c, 3c on the disc rotor entrance side and the disc rotor exit side, respectively, via pad retainers 11. Also, pad retainer attachment portions 3h, 3h are provided on disc-radial-direction outer sides of the pad guide grooves 3c, 3c, respectively. Each pad retainer attachment portion 3h has an attachment surface 3g which extends in a parallel direction to the disc-radial-direction outer surface 3d.

A lining 6c is affixed to one side surface of the back plate 6a of each friction pad 6. Also, the lug pieces 6b, 6b (an example of side portions of the back plate 6a) protrude from the both sides of the back plate 6a. A pad return spring 7 is attached to each lug piece 6b. Each lug piece 6b has a first surface 6d which lies on the disc rotor side and a second surface 6e which lies on an opposite side to the disc rotor side. Engagement grooves 6f are formed on the first surface 6d and the second surface 6e, respectively for attachment of the pad return spring 7. Each engagement groove 6f is formed so as to deepen gradually from an inner side of the lug piece 6b to an outer side of the lug piece 6b.

Each pad return spring 7 is formed by bending a strip-shaped metallic plate. Each pad return spring 7 includes a lug piece attachment portion 7a (an example of a back plate attachment portion) and a pad return portion 7b. The lug piece attachment portion 7a is attached to the lug piece 6b. The pad return portion 7b extends from an end portion, on an opposite side to the disc rotor 2, of the lug piece attachment portion 7a towards the opposite side to the disc rotor 2 and is bent back towards the disc rotor side. A distal end of the pad return portion 7b is in abutment with a side surface 3i of the caliper support arm 3a which lies on an opposite side to the disc rotor 2. The lug piece attachment portion 7a has a first piece 7c, a second piece 7e, and a connecting piece 7d. The lug attachment portion 7a is formed into a substantially U shape in section. The first piece 7c is disposed on the first surface 6d of the lug piece 6b. The second piece 7e is disposed on the second surface 6e of the lug piece 6b. The connecting piece 7d is disposed on an outer end face 6g of the lug piece 6b. The connecting piece 7d connects the first piece 7c and the second piece 7e together. Engagement claws 7f (an example of engagement protrusion portions) are formed in the first piece 7c and the second piece 7e, respectively. Specifically, the engagement claw 7f is cut in the first piece 7c or the second piece 7e so as to stand therefrom towards the lug piece 6b, so that the engagement claws 7f gradually approach each other as they extend towards the connecting piece 7d. The engagement claws 7f are brought into engagement with the engagement grooves 6f, respectively. Also, a wearing detection portion 7g is formed at a distal end portion of the first piece 7c. The wearing detection portion 7g is bent towards the disc rotor side and protrudes towards the disc rotor side. The wearing detection portion 7g is configured to be brought into sliding contact with the side surface of the disc rotor 2 when the lining 6c of the friction pad 6 wears by a pre-set amount or more, so as to notify the worn state of the lining 6c.

The pad return portion 7b includes an extending portion 7h, a spring portion 7i, an inclined piece 7j, and an abutment portion 7k. The extending portion 7h extends from the end portion of the second piece 7e towards the opposite side to the disc rotor 2 so as to be in parallel to the disc axis. The spring portion 7i extends from a distal end of the extending portion 7h towards the side surface 3i, on the opposite side opposite to the disc rotor 2, of the caliper support arm 3a while being inclined. The inclined piece 7j is inclined further from a distal end of the spring portion 7i towards the side surface 3i at an acute angle. The abutment portion 7k is formed by bending back a distal end portion of the inclined piece 7j 90 degrees outwards. The inclined piece 7j is formed so as to gradually narrow in width from the spring portion 7i side towards the abutment portion 7k side.

Furthermore, the metallic plate making up the pad return spring 7 attached to the lug piece 6b on the disc entrance side is thicker than the metallic plate making up the pad return spring 7 attached to the lug piece 6b on the disc exit side. A friction pad return force of the pad return spring 7 which is attached to the lug piece 6b on the disc entrance side is stronger than a friction pad return force of the pad return spring 7 which is attached to the lug piece 6b on the disc exit side. In order to prevent the erroneous assembling of the pad return springs 7, a marking slit 7m (an example of an identifier) is formed on the spring portion 7i of the pad return spring 7 which is attached to the lug piece 6b on the disc entrance side.

The pad return spring 7 that is formed in the manner described above is assembled to the lug piece 6b as follows. Namely, the lug piece attachment portion 7a is fitted to the inner side of the lug piece 6b from the outside of the lug piece 6b while forcing the engagement claws 7f, 7f to open. Then, when the engagement claws 7f, 7f are disposed in positions which correspond to the engagement grooves 6f, 6f, the engagement claws 7f, 7f are restored to their initial states to thereby engage with the grooves 6f, 6f automatically. The friction pad 6 with the pad return springs 7 attached to the corresponding lug pieces 6b is assembled to the caliper body 5 as follows. Namely, the lug pieces 6b, 6b are inserted into the guide grooves 3c, 3c, to which the pad retainers 10 are attached, respectively, from an opposite side to the disc rotor 2. Then, the abutment portions 7k of the pad return portions 7b are brought into abutment with the side surfaces 3i of the caliper support arms 3a. Furthermore, the wearing detection portions 7g are caused to protrude towards the disc rotor. Also, the friction pad return force of the pus return spring 7 which is attached to the lug piece 6b on the disc entrance side is stronger than the friction pad return force of the pad return spring 7 which is attached to the lug piece 6b on the disc exit side. Therefore, the disc entrance side of the friction pad 6 assembled to the caliper body 5 is spaced more away from the side surface of the disc rotor 2 than the disc exit side of the friction pad 6.

In the vehicle disc brake 1 of this exemplary embodiment, when hydraulic fluid which is pressurized is supplied into the hydraulic pressure chamber 9 by driver's braking operation, the piston 8 advances inside the cylinder bore 5d to thereby press the friction pad 6 on the acting portion 5a side against one side surface of the disc rotor 2. Then, the caliper body 5 is caused to move in the acting portion 5a direction while being guided by the slide pins 4, 4 by virtue of a reaction force generated by the pressure exerted on the one side of the disc rotor 2, whereby reaction claws 5f press the friction pad 6 of the reacting portion 5b against the other side surface of the disc rotor 2. As this occurs, as the friction pad 6 is pressed against the side surface of the disc rotor 2, the pad return spring 7 is deformed so that the spring portion 7i is spaced away from the lug piece 6b as indicated by imaginary lines in FIG. 1.

On the other hand, when the above described braking operation is released and the piston 8 and the reaction claws 5f retreat to their positions where the piston 8 and the reaction claws 5f are located at the start of braking, the spring portions 7i of the pad return springs 7 attempt to restore their initial shapes. Therefore, the lug pieces 6b, 6b are pressed towards the opposite side to the disc rotor 2 via the lug piece attachment portions 7a, 7a, whereby the friction pads 6, 6 are forcibly separated from the side surfaces of the disc rotor 2. This prevents the friction pads 6 from being dragged by the disc rotor 2. Also, it is possible to realize the suppression of generation of judder attributed to the wear of the disc rotor 2 and the suppression of generation of brake squeal.

Further, repeatedly braking causes the linings 6c of the friction pads 6 to wear. This makes the back plates 6a of the friction pads 6 approach the disc rotor 2 gradually. However, when the wear amounts of the linings 6c exceed a predetermined wear amount which is set in advance, the wearing detection portions 7g are brought into sliding contact with the side surfaces of the disc rotor 2 to generate a warning sound so that the driver can be notified that the linings 6c have been worn down.

In this exemplary embodiment, as has been described above, part of the first piece 7c of the pad return spring 7 and part of the second piece 7e of the pad return spring 7 are cut to stand to thereby form the engagement claws 7f. Also, the engagement grooves 6f are respectively formed on the first surface 6d and the second surface 6e of the lug pieces 6b. Thus, the engagement claws 7f and the engagement grooves 6f can easily be formed. Also, the pad return springs 7 can be attached to the lug pieces 6b easily and surely only by fitting the lug attachment portions 7a to the lug pieces 6b. This can reduce work required to assemble the pad return springs 7, to thereby make it possible to reduce the manufacturing costs. Further, the wearing detection portions 7g are formed integrally with the pad return springs 7. Therefore, the number of parts can be reduced. Also, the friction pad return force, resulting when the vehicle travels forwards, of the pad return spring 7 disposed on the disc entrance side is stronger than the friction pad return force, resulting when the vehicle travels forwards, of the pad return spring 7 disposed on the disc exit side. Therefore, the friction pad 6 is spaced more away from the side surface of the disc rotor 2 on the disc entrance side than on the disc exit side. Consequently, it is possible to suppress the risk of the friction pad 6 being dragged by the disc rotor 2.

In the above described exemplary embodiment, part of the first and second pieces of the lug piece attachment portion of each pad return spring are partially cut to stand so as to form the engagement claws. However, the invention is not limited thereto. Part of the first and second pieces may be swollen towards the lug piece to form engagement protrusion portions. Further, engagement protrusion portions may be provided on the lug piece, while engagement grooves may be formed in the lug piece attachment portion of the pad return spring for engagement with the engagement protrusion portions. Also, the engagement protrusion portions and the engagement grooves can be formed in arbitrary positions, and the numbers of the engagement protrusion portions and the engagement grooves are also arbitrary. Further, the material, size and/or shape of the pad return spring which is disposed on the disc entrance side may be different from those of the pad return spring which is disposed on the disc exit side so that the friction pad return force of the pad return spring disposed on the disc entrance side is stronger than the friction pad return force of the pad return spring disposed on the disc exit side. Also, the friction pad return force of the pad return spring disposed on the disc entrance side may be equal to the friction pad return force of the pad return spring disposed on the disc exit side. Further, the back plate may have no lug piece. The pad return springs may be attached to both sides of the back plate.

DESCRIPTION OF REFERENCE SIGNS

1: vehicle disc brake
2: disc rotor

3: caliper bracket
3a: caliper support arm
3b: tie-rod
3c: pad guide groove
3d: disc-radial-direction outer surface
3e: disc-radial-direction inner surface
3f: opposing surface
3g: attachment surface
3h: pad retainer attachment portion
3i: side surface lying on side opposite to side facing disc rotor
4: slide pin
5: caliper body
5a: acting portion
5b: reacting portion
5c: bridge portion
5d: cylinder bore
5e: vehicle body attachment arm
5f: reaction claw
6: friction pad
6a: back plate
6b: lug piece
6c: lining
6d: first surface
6e: second surface
6f: engagement groove
6g: outer end face
7: pad return spring
7a: lug piece attachment portion
7b: pad return portion
7c: first piece
7d: connecting piece
7e: second piece
7f: engagement claw
7g: wearing detection portion
7h: extending portion
7i: spring portion
7j: inclined piece
7k: abutment portion
7m: slit
8: piston
9: hydraulic pressure chamber
10: attachment bolt
11: pad retainer

What is claimed is:

1. A vehicle disc brake, comprising:
a caliper bracket to be fixed to a vehicle body, the caliper bracket including a pair of caliper support arms that straddle an outer edge of a disc rotor in a disc axis direction;
a pair of friction pads that are disposed across the disc rotor, each friction pad including a back plate having side portions; and
pad return springs each of which
is disposed between the corresponding caliper support arm and the corresponding side portion of the back plate, and
urges the corresponding friction pad toward an opposite side to the disc rotor when braking is released, wherein
each pad return spring includes
a back plate attachment portion that is attached to the corresponding side portion of the back plate, and
a pad return portion that extends from the back plate attachment portion toward the opposite side to the disc rotor and then bends toward a disc rotor side and that has a distal end abutting against a corresponding side surface, opposite to the disc rotor, of the caliper support arm,
the back plate attachment portion of each pad return spring includes
a first piece that is disposed on a first surface, on the disc rotor side, of the corresponding side portion of the back plate,
a second piece that is disposed on a second surface, on the opposite side to the disc rotor side, of the corresponding side portion of the back plate, and
a connection piece that is disposed on an outer end surface of the corresponding side portion of the back plate and that connects the first piece and the second piece,
the back plate attachment portion of each pad return spring has a substantially U shape in section, and
a part of one of the back plate attachment portion of each pad return spring and the corresponding side portion of the back plate engages with the other, wherein
the one of the back plate attachment portion of each pad return spring and the corresponding side portion of the back plate includes an engagement protrusion portion,
the other of the back plate attachment portion of each pad return spring and the corresponding side portion of the back plate is formed with an engagement groove with which the engagement protrusion portion engages,
the first and second pieces of the back plate attachment portion of each pad return spring are formed with the engagement protrusion portions that bend toward the corresponding side portion of the back plate so as to gradually approach each other as it goes toward the connection piece,
the first and second surfaces of each side portion of the back plate are formed with the engagement grooves,
friction pad return forces of the pad return springs disposed on a disc entrance side from which the disc rotor enters when a vehicle travels forward are stronger than those of the pad return springs disposed on a disc exit side to which the disc rotor exits when the vehicle travels forward, and
the pad return spring attached to a lug piece on the disc entrance side is thicker than the pad return spring attached to a lug piece on the disc exit side.

2. The vehicle disc brake according to claim 1, wherein each pad return spring is formed by bending a strip-shape plate member.

3. The vehicle disc brake according to claim 1, wherein each pad return spring further includes a wearing detection portion at a distal end of the first piece thereof,
each wearing detection portion protrudes toward the disc rotor side, and
each wearing detection portion is configured, when a wearing amount of a lining of the corresponding friction pad exceeds a predetermined wearing amount, to be in slide contact with the disc rotor so as to notify a wearing state of the lining.

4. The vehicle disc brake according to claim 1, wherein ones of (i) the pad return springs disposed on the disc entrance side and (ii) the pad return springs disposed on the disc exit side further include identifiers.

5. The vehicle disc brake according to claim 1, wherein the pad return portion of each pad return spring further comprises an extending portion, a spring portion, an inclined piece, and an abutment portion.

6. The vehicle disc brake according to claim 5, wherein the abutment portion is formed by bending back a distal end portion of the inclined piece 90 degrees outwards.

7. The vehicle disc brake according to claim 5, wherein the inclined piece is inclined further from the distal end of the spring portion towards the side surface at an acute angle.

8. The vehicle disc brake according to claim 7, wherein the inclined piece is formed so as to narrow in width from the spring portion side towards the abutment portion side.

9. The vehicle disc brake according to claim 1, wherein the pad return portion of each pad return spring includes
an extending portion that extends from an end portion of the second piece towards the opposite side to the disc rotor so as to be in parallel to the disc axis,
a spring portion that extends from a distal end of the extending portion towards the side surface, on the opposite side opposite to the disc rotor, of the caliper support arm while being inclined, and
an inclined piece inclined further from a distal end of the spring portion towards the side surface at an acute angle.

10. A vehicle disc brake, comprising:
a caliper bracket to be fixed to a vehicle body, the caliper bracket including a pair of caliper support arms that straddle an outer edge of a disc rotor in a disc axis direction;
a pair of friction pads that are disposed across the disc rotor, each friction pad including a back plate having side portions; and
pad return springs each of which
is disposed between the corresponding caliper support arm and the corresponding side portion of the back plate, and
urges the corresponding friction pad toward an opposite side to the disc rotor when braking is released, wherein
each pad return spring includes
a back plate attachment portion that is attached to the corresponding side portion of the back plate, and
a pad return portion that extends from the back plate attachment portion toward the opposite side to the disc rotor and then bends toward a disc rotor side and that has a distal end abutting against a corresponding side surface, opposite to the disc rotor, of the caliper support arm,
the back plate attachment portion of each pad return spring includes
a first piece that is disposed on a first surface, on the disc rotor side, of the corresponding side portion of the back plate,
a second piece that is disposed on a second surface, on the opposite side to the disc rotor side, of the corresponding side portion of the back plate, and
a connection piece that is disposed on an outer end surface of the corresponding side portion of the back plate and that connects the first piece and the second piece,
the back plate attachment portion of each pad return spring has a substantially U shape in section, and
a part of one of the back plate attachment portion of each pad return spring and the corresponding side portion of the back plate engages with the other, wherein
the one of the back plate attachment portion of each pad return spring and the corresponding side portion of the back plate includes an engagement protrusion portion,
the other of the back plate attachment portion of each pad return spring and the corresponding side portion of the back plate is formed with an engagement groove with which the engagement protrusion portion engages,
the first and second pieces of the back plate attachment portion of each pad return spring are formed with the engagement protrusion portions that bend toward the corresponding side portion of the back plate so as to gradually approach each other as it goes toward the connection piece,
the first and second surfaces of each side portion of the back plate are formed with the engagement grooves,
friction pad return forces of the pad return springs disposed on a disc entrance side from which the disc rotor enters when a vehicle travels forward are stronger than those of the pad return springs disposed on a disc exit side to which the disc rotor exits when the vehicle travels forward,
ones of (i) the pad return springs disposed on the disc entrance side and (ii) the pad return springs disposed on the disc exit side further include identifiers, and
the identifier is a marking slit formed on a spring portion of the pad return portion.

11. A vehicle disc brake, comprising:
pad return springs each of which comprises
a back plate attachment portion which has a substantially U shape in section, and
a pad return portion,
the back plate attachment portion of each pad return spring includes
a first piece,
a second piece, and
a connection piece that connects the first piece and the second piece,
a part of one of the back plate attachment portion of each pad return spring and a corresponding side portion of the back plate engages with the other, and
the pad return portion of each pad return spring includes
an extending portion that extends from an end portion of the second piece towards an opposite side to a disc rotor so as to be in parallel to a disc axis,
a spring portion that extends from a distal end of the extending portion towards a side surface, on the opposite side opposite to the disc rotor, of a caliper support arm while being inclined, and
an inclined piece inclined further from a distal end of the spring portion towards the side surface at an acute angle,
wherein the pad return portion of each pad return spring further comprises an abutment portion,
the abutment portion is formed by bending back a distal end portion of the inclined piece 90 degrees outwards,
the inclined piece is formed so as to narrow in width from the spring portion side towards the abutment portion side, and
the pad return spring is thicker on one side than another side.

12. The vehicle disc brake according to claim 10, further comprising a marking slit formed on the spring portion.

* * * * *